2,772,205

DENTAL FLOSS CONTAINING HIGHER ALIPHATIC ACYL AMIDE OF AN AMINOCARBOXYLIC ACID COMPOUND

William James King, River Edge, N. J., assignor to Colgate-Palmolive Company, Jersey City, N. J., a corporation of Delaware Application September 7, 1954, Serial No. 454,634

5 Claims. (Cl. 167—93)

The terminal portion of the term of the patent subsequent to September 14, 1971 has been disclaimed and dedicated to the public.

The present invention relates to new dental floss products comprising a higher aliphatic acyl amide of an amino carboxylic acid compound. The instant application is a continuation-in-part of co-pending application, S. N. 271,864 filed February 15, 1952, now U. S. Patent No. 2,689,170, issued September 14, 1954.

In general, it has been proposed that chemicals of various kinds may be added to dental floss according to their known use or action. Broadly, it has been suggested that certain substances may be incorporated in dental floss which will protect the teeth, or neutralize or buffer acid in the mouth.

It has now been discovered that dental floss may have adsorbed thereon a higher aliphatic acyl amide of an amino carboxylic acid compound, as hereinafter described and claimed. These compounds have the unique property of inhibiting acid production in the mouth for a prolonged period of time. Such acid formation occurs from the degradation of fermentable carbohydrates by enzymes which are produced by micro-organisms found in the oral cavity. These active ingredients are characterized also by the unusual property of being adsorbed upon and released from suitable protein material in the presence of saliva, which property in part permits the acid-inhibiting effect in the mouth for a prolonged period of time.

In general, the suitable active ingredients are the substantially saturated higher aliphatic acyl amides of lower aliphatic amino carboxylic acid compounds, such as those having about 12 to 16 carbon atoms in a long-chain fatty acyl radical. Optimum results are achieved with the dodecanoyl, tetradecanoyl, hexadecanoyl derivatives, with the preferred amides having the formula:

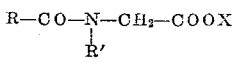

wherein R—CO— is a saturated fatty acyl radical of 12 to 16 carbon atoms, R' is hydrogen or lower alkyl group (preferably methyl) and X is hydrogen or a cation which forms water-soluble salts.

These compounds may be produced by the condensation of a higher fatty acylating substance with the suitable amino compound. The lower amino acid portion of these active ingredients is generally derived from the lower aliphatic saturated monoaminocarboxylic acids, such as those having about 2 to 6 carbons, usually the monocarboxylic acid derivatives. It is preferred that the compounds be derived from the amino substituted lower alkane carboxylic acids, particularly the alpha amino substituted acids. Suitable amino acids from which the higher fatty amides thereof may be derived are aminoethanoic acid (glycine), methylaminoethanoic acid (sarcosine), 2-aminopropanoic acid (alanine), 3-aminopropanoic acid, and valine. It is preferred to use the amides of those acids having about 2 to about 5 carbon atoms, and particularly, the sarcoside derivatives and homologues having up to about 5 carbon atoms in the amino acid portion of the molecule in view of the excellent results obtained by their use.

Such amides of amino carboxylic acid compounds are to be generally employed in the form of their free acids or preferably as the water-soluble salts thereof. In general, the desired salts are the water-soluble carboxylate salts such as the alkali metal (e. g. sodium, potassium, etc.), ammonium, amine, alkylolamine (e. g. mono-, di-, tri-ethanolamine), etc. Further specific examples are sodium N-lauroyl sarcoside, potassium N-lauroyl sarcoside, sodium N-myristoyl sarcoside, sodium N-palmitoyl sarcoside, N-lauroyl sarcosine, sodium N-lauroyl alanine, and sodium N-lauroyl glycide. The alkali metal salt derivatives appear to be about equally effective and yield usually optimum results in comparison to other water-soluble salts. For convenience herein, reference to "amino carboxylic acid compounds," "sarcoside," "glycide," etc., refers to such compounds having a free carboxylic group or the water-soluble carboxylic salts.

These amides should be utilized in pure or substantially pure form. They should be substantially free from soap or similar higher fatty acid material which is formed in normal commercial methods of manufacture and which tends to neutralize or substantially reduce the special characteristics which are exhibited by these amide compounds. In usual practice, the amount of higher fatty acid material should be less than 15% by weight of the amide compound and insufficient to substantially adversely affect said amide, and preferably less than about 10% of said amide compound.

Any suitable amount of amide compound may be used, depending upon various factors, including the type of material, its adsorptivity and the manner of applying it to the waxed or unwaxed floss. In general, such suitable amount may be selected from the range of about 0.001 to about 5% by weight of the final product, though greater or lesser amounts of the active ingredient may be used as desired.

Any suitable dental floss material may be employed in the present invention. There is a relatively large number of such materials known in the art, including natural and synthetic yarns and similar materials. Specific examples are linen, silk, cotton, nylon and other resins, catgut, suitable paper, fibre and similar cellulosic products, and various mixtures thereof. The floss may be of any suitable size, shape or design; it may be round or flat, and composed of braided, spun, fused or twisted fibers.

The active ingredient may be adsorbed (or otherwise applied) upon the dental floss or tape in any suitable manner. The floss may be treated with an aqueous or other suitable solution of the active ingredient in order to adsorb it, followed by drying the treated product. Alternatively, the active ingredient may be applied in solid or semi-solid form by dusting or mechanically impregnating it upon the floss.

It is common in the art to coat or otherwise apply a wax-like material to the floss in order to render it smooth. Suitable waxes, both natural and synthetic, are known and they may be water-soluble or water-insoluble. Examples thereof are beeswax, paraffin, petroleum wax, solid polyethylene glycols (e. g. Carbowax 4000 and 1500), wax-like resins and polymers, microcrystalline waxes, and the like. The active ingredient may be adsorbed or coated with the wax coating in any suitable manner. It may be uniformly admixed with the molten wax which may then be applied to the dental floss by rolling, brushing, dipping and similar techniques. Alternatively, the active ingredient may be rolled, sifted, dusted, sprayed, or otherwise applied upon a waxed floss material in such manner as to adsorb or coat it thereon.

Various adjuvant materials may be employed in known manner in the present invention also. Such materials include suitable coloring agents, gums such as glue, gelatin, sodium carboxymethylcellulose, and the like.

The dental floss of the present invention thus constitutes a novel and unusual type of product in the art. It provides a means for not only dislodging food particles and the like lodged between the teeth but of applying the active ingredient directly to the interproximal surfaces and the mucin plaque situated in adjacent areas which cannot be penetrated as well by a dentifrice applied with a toothbrush. As indicated, it is believed that the effectiveness of the active ingredients is due primarily to the combination of its acid-inhibitory action and its adsorption within the oral cavity, probably upon the mucin plaque, whereby it remains active for a prolonged period of time and during subsequent ingestion and fermentation of the carbohydrates. The active ingredients possess further unusual properties of particular consideration in this field also. Thus, it has been found that the active ingredients possess the property of reducing the solubility of tooth enamel in the acid to varying degrees. Such laboratory tests for evaluating the reduction in enamel solubility are known. Data obtained in such tests with the active ingredients indicate, for example, that sodium N-lauroyl sarcoside reduces enamel solubility slightly, that sodium N-myristoyl sarcoside reduces it to a somewhat greater degree, and that sodium N-palmitoyl sarcoside reduces it to a still greater degree approximating that obtained with sodium fluoride. These various effects are supplemented by the detergent and cleansing power of the active ingredients also.

The following specific examples are further illustrative of the nature of the present invention, but it is to be understood that the invention is not limited thereto. All amounts of the various ingredients are by weight unless otherwise specified.

Example I

A commercial unwaxed dental floss material is treated with a 0.2% aqueous solution of sodium N-lauroyl sarcoside for one hour, after which the mixture is filtered and the treated floss is dried. Small portions (100, 150, 200 and 300 mg.) of this treated floss are added to Snyder tubes containing a nutrient dextrose agar with bromcresol green indicator which had been previously inoculated with saliva. After 72 hours incubation at 37° C., the tubes containing the treated dental floss were still green in color indicating marked inhibition of acid production, while similar tubes containing untreated dental floss were yellow after 24 hours incubation indicating rapid acid production.

In place of the sodium N-lauroyl sarcoside, other active ingredients may be used such as sodium N-myristoyl sarcoside, sodium N-palmitoyl sarcoside, sodium N-lauroyl alanine, potassium N-lauroyl sarcoside and sodium N-lauroyl glycide with similar successful results.

Example II

Sodium N-lauroyl sarcoside in finely divided form is intimately mixed with molten beeswax to form a homogeneous mixture containing about 5% sarcoside. Nylon dental floss yarn is then drawn slowly through the mixture to produce a waxed coated floss containing the sarcoside.

Although the present invention has been described with reference to the particular embodiments and examples it will be apparent to those skilled in the art that variations and modifications of this invention can be made and that equivalents can be substituted therefor without departing from the principles and true spirit of the invention.

Having thus described the invention, what is claimed is:

1. Dental floss comprising a substantially saturated aliphatic acyl amide of a saturated aliphatic monoaminocarboxylic acid compound having 2 to 6 carbon atoms, the aliphatic acyl group having about 12 to 16 carbon atoms, and less than about 15% by weight based on said amide of higher fatty acid material, the amount of said material being insufficient to substantially adversely affect said amide.

2. Dental floss comprising an active ingredient selected from the group consisting of N-lauroyl, myristoyl and palmitoyl sarcosides, having less than about 15% by weight based on said sarcoside of higher fatty acid material, the amount of said material being insufficient to substantially adversely affect said sarcoside.

3. Dental floss having adsorbed thereon sodium N-lauroyl sarcoside, having less than about 10% of higher fatty acid material based on the weight of said sarcoside.

4. Dental floss having adsorbed thereon sodium N-myristoyl sarcoside, having less than about 10% of higher fatty acid material based on the weight of said sarcoside.

5. Dental floss having adsorbed thereon sodium N-palmitoyl sarcoside, having less than about 10% of higher fatty acid material based on the weight of said sarcoside.

References Cited in the file of this patent

UNITED STATES PATENTS

| Number | Name | Date |
|---|---|---|
| 185,666 | Brown | Dec. 26, 1876 |
| 1,069,874 | Hanscom | Aug. 12, 1913 |
| 1,285,988 | Gudebrod | Nov. 26, 1918 |
| 1,839,486 | Lawton | Jan. 5, 1932 |
| 1,989,895 | Van Gilder | Feb. 5, 1935 |
| 2,667,443 | Ashton | Jan. 26, 1954 |
| 2,689,170 | King | Sept. 14, 1954 |
| 2,700,636 | Ashton | Jan. 25, 1955 |